United States Patent
Ju et al.

(10) Patent No.: US 10,014,560 B2
(45) Date of Patent: Jul. 3, 2018

(54) SECONDARY BATTERY PACK

(71) Applicant: SK Innovation Co., Ltd., Seoul (KR)

(72) Inventors: Seung Hoon Ju, Daejeon (KR); Ji Yoon Lee, Daejeon (KR); Dong Hun Lim, Daejeon (KR); Yun Nyoung Lee, Daejeon (KR); Won Wook Kim, Daejeon (KR); Sang Hyuk Kim, Daejeon (KR); Jeong Woon Ko, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 193 days.

(21) Appl. No.: 14/904,836

(22) PCT Filed: Jun. 26, 2014

(86) PCT No.: PCT/KR2014/005667
§ 371 (c)(1),
(2) Date: Jan. 13, 2016

(87) PCT Pub. No.: WO2015/008948
PCT Pub. Date: Jan. 22, 2015

(65) Prior Publication Data
US 2016/0172715 A1 Jun. 16, 2016

(30) Foreign Application Priority Data

Jul. 16, 2013 (KR) ........................ 10-2013-0083624

(51) Int. Cl.
*H01M 2/10* (2006.01)
*H01M 2/34* (2006.01)
(Continued)

(52) U.S. Cl.
CPC ........... *H01M 10/425* (2013.01); *H01M 2/04* (2013.01); *H01M 2/1022* (2013.01);
(Continued)

(58) Field of Classification Search
None
See application file for complete search history.

(56) References Cited

U.S. PATENT DOCUMENTS 6,143,440 A 11/2000 Volz et al.
2004/0247994 A1 12/2004 Masuda et al.
(Continued)

FOREIGN PATENT DOCUMENTS

EP 1073132 A1 1/2001
EP 1406340 A1 4/2004
(Continued)

*Primary Examiner* — Jonathan Crepeau
(74) *Attorney, Agent, or Firm* — The Webb Law Firm

(57) ABSTRACT

Provided is a secondary battery pack including a plurality of secondary battery modules including a plurality of secondary battery cells stacked in parallel to each other in a vertical direction, a cover, and a switch installed at an upper side of the one end in the horizontal direction of the cover, a housing, a Power Relay Assembly (PRA) including a relay electrically connected to the secondary battery cells and switches, for transmitting charging power supplied from the outside to the secondary battery cells when the relay is in a close state and changing the relay to an open state when the switch is pushed according to pressure applied to an upper side from a lower surface of the cover, and a Battery Management System (BMS) for controlling the Power Relay Assembly (PRA).

4 Claims, 4 Drawing Sheets

(51) Int. Cl.
*H01M 10/42* (2006.01)
*H01M 2/04* (2006.01)

(52) U.S. Cl.
CPC ......... *H01M 2/1077* (2013.01); *H01M 2/345* (2013.01); *H01M 2010/4271* (2013.01); *H01M 2220/30* (2013.01)

(56) References Cited

U.S. PATENT DOCUMENTS

| | | |
|---|---|---|
| 2007/0259255 A1 | 11/2007 | Leysieffer et al. |
| 2010/0247980 A1 | 9/2010 | Jang et al. |
| 2011/0037430 A1 | 2/2011 | Jang |
| 2012/0148890 A1 | 6/2012 | Goto et al. |
| 2013/0045401 A1 | 2/2013 | Yoon et al. |
| 2014/0127549 A1 | 5/2014 | Roh et al. |

FOREIGN PATENT DOCUMENTS

| | | |
|---|---|---|
| EP | 2549580 A1 | 1/2013 |
| KR | 1020090047240 A | 5/2009 |
| KR | 1020090113521 A | 11/2009 |
| KR | 1020120016354 A | 2/2012 |
| KR | 1020130012354 A | 2/2013 |
| KR | 1020130037863 A | 4/2013 |

[Fig. 1]
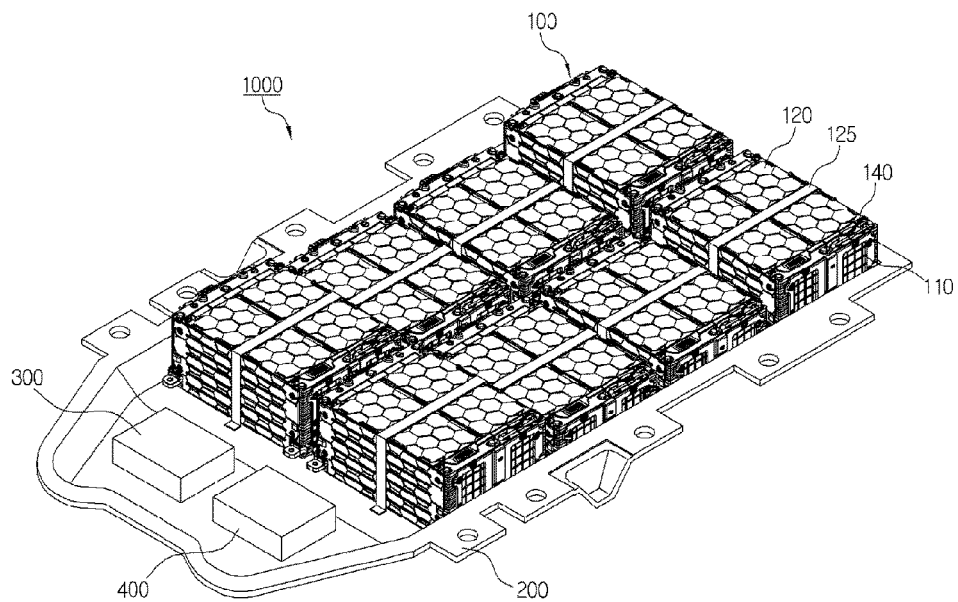
[Fig. 2]
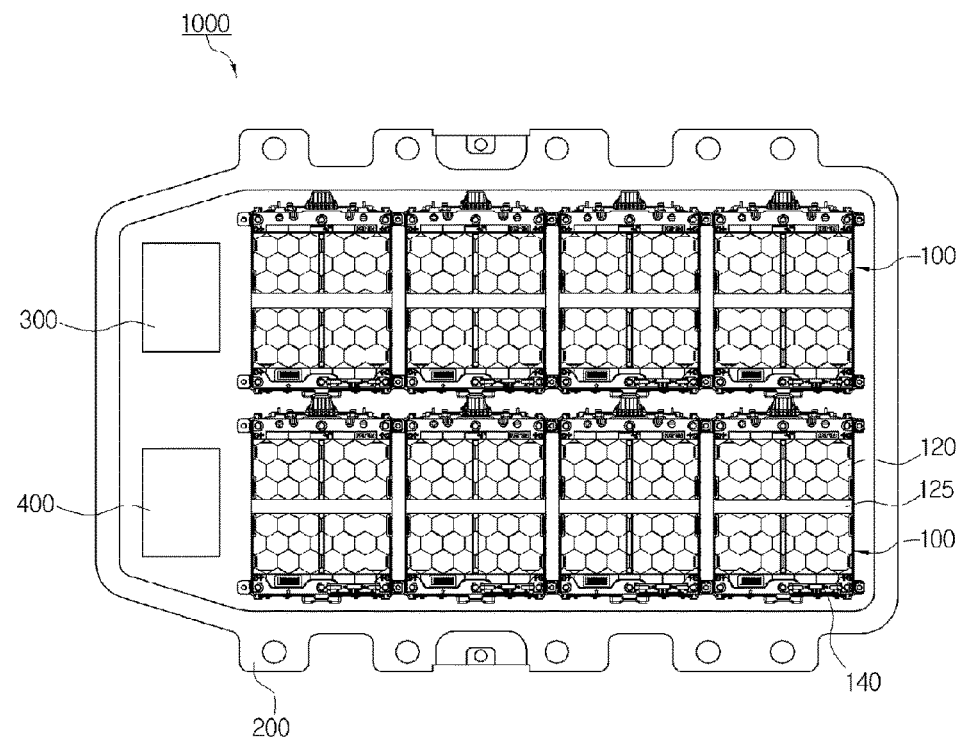

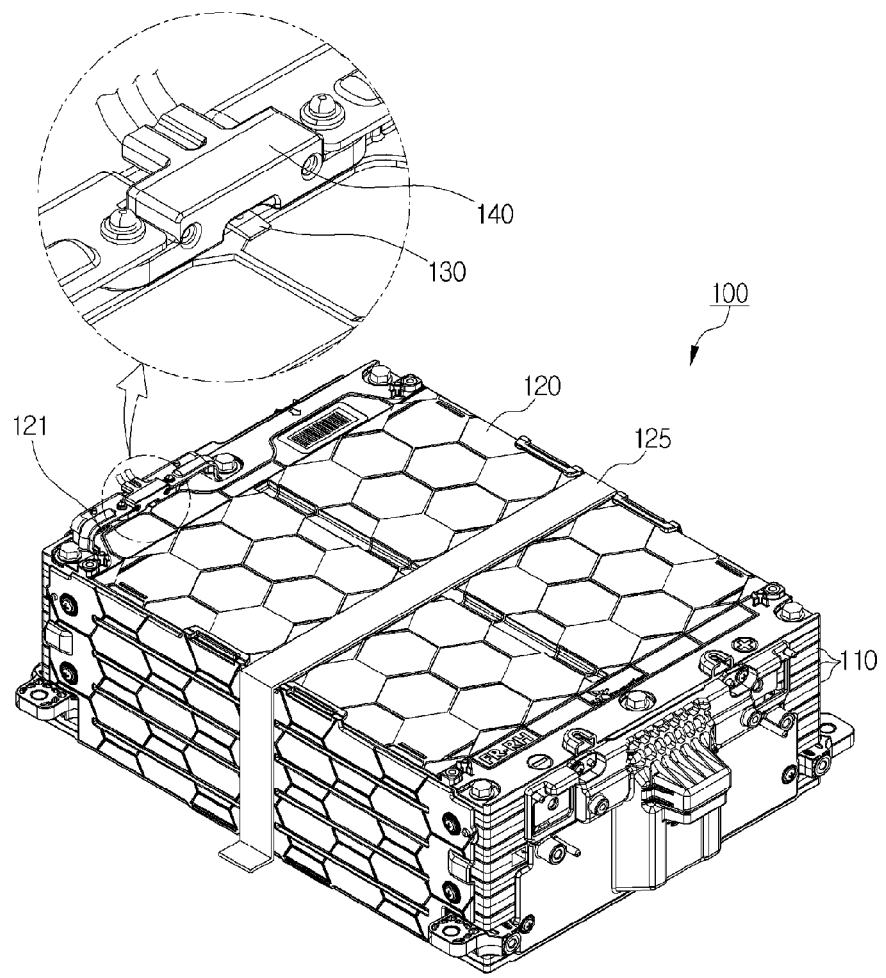
[Fig. 3]

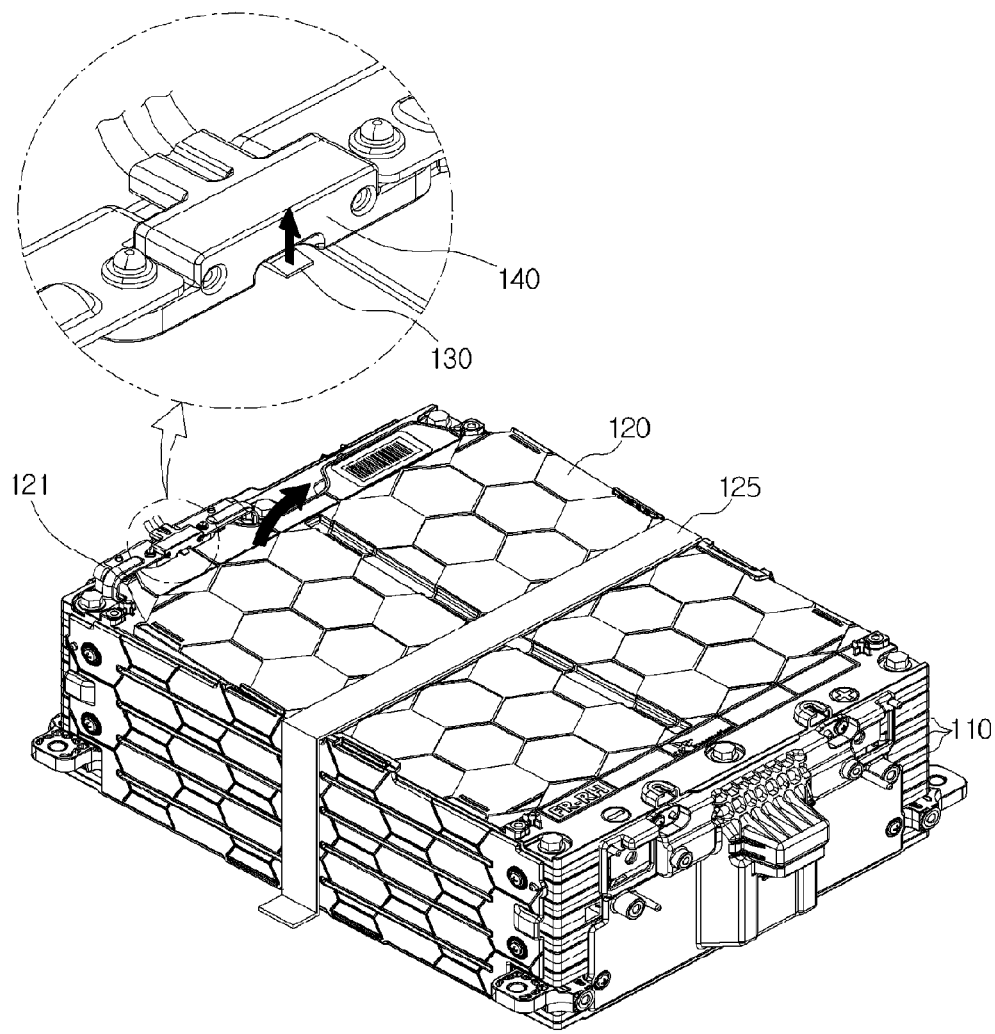
[Fig. 4]

[Fig. 5]
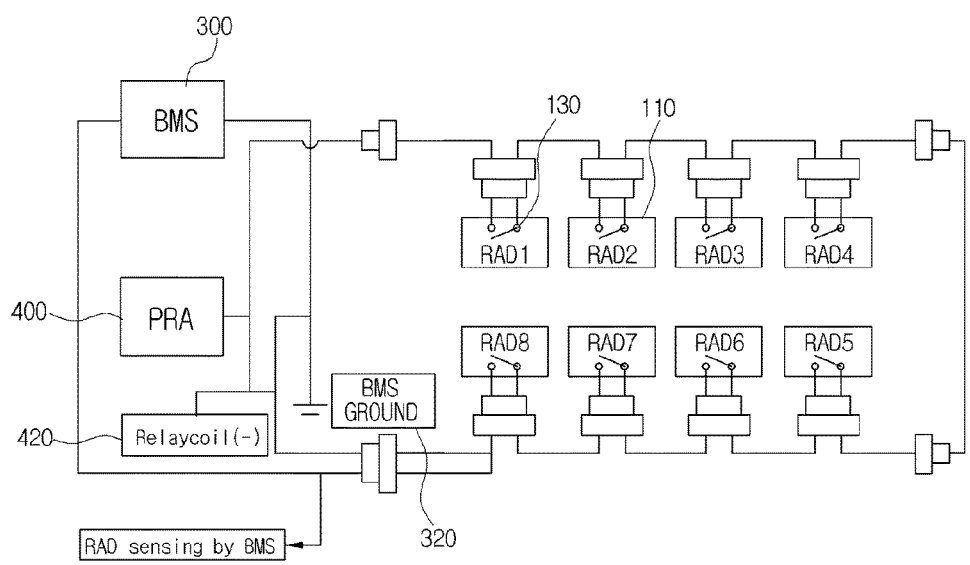

SECONDARY BATTERY PACK

CROSS-REFERENCE TO RELATED APPLICATIONS

This application is the U. S. national phase of International Application No. PCT/KR2014/005667 filed Jun. 26, 2014, and claims priority to Korean Patent Application No. 10-2013-0083624 filed Jul. 16, 2013, the disclosures of which are hereby incorporated in their entirety by reference.

TECHNICAL FIELD

The present invention relates to a chargeable and dischargeable secondary battery pack.

BACKGROUND ART

In general, as portable electronic devices such as video cameras, cellular phones, and portable computers have become lightweight and highly functionalized, a significant amount of research has been conducted into a secondary battery used as a driving source thereof.

The secondary battery may be, for example, a nickel-cadmium battery, a nickel-hydrogen battery, a nickel-zinc battery, a lithium secondary battery, or the like.

Among these, a lithium secondary battery is advantageous because the battery may be miniaturized and large and has high operation voltage and high energy density per unit weight and thus has been widely used in many fields.

In particular, in order to solve air pollution and so on due to a conventional gasoline vehicle or diesel vehicle using fossil fuel, research has been actively conducted in recent years into an electric vehicle (EV), a hybrid electric vehicle (HEV), a plug-in hybrid electric vehicle (P-HEV), and so on, which use a chargeable and dischargeable secondary battery.

Unlike small-size mobile devices, a medium-to-large size device such as a vehicle requires a high-output and large-capacity secondary battery, and thus uses a medium-to-large size secondary battery module formed by connecting a plurality of battery cells.

It is preferable to manufacture a medium-to-large size secondary battery module with as small as possible size and weight, and thus prismatic batteries, pouch-type batteries, and so on, which are stacked with a high integration degree and have a small weight compared with capacity have been mainly used as a battery cell of a medium-to-large size battery pack.

With the large-size battery pack, U.S. Patent No. 2013-0045401 discloses a battery pack comprising an electrode module formed by sequentially stacking a cathode plate, a separator, and an anode plate; a pouch for sealing the electrode module; a lead tab that is connected to the electrode module and is partially exposed out of the pouch; and a case for supporting one surface of the pouch in which the electrode module is sealed and one surface of the lead tab and including a terminal portion in which the lead tab is accommodated, wherein the terminal portion includes a first groove portion for attaching a temperature sensor thereto and a second groove portion for coupling a bus bar thereto.

However, according to the prior art, since swelling whereby a pouch billows due to overcharge of a battery pack may occur which causes a short circuit of an internal electrode, the battery pack is likely to ignite, and thus safety is not capable of being ensured.

RELATED ART DOCUMENT

Patent Document (Patent Document 1) U.S. Patent No. 2013-0045401 (Feb. 21, 2013)

TECHNICAL PROBLEM

An object of the present invention is to provide a secondary battery pack for shutting off power supplied to secondary battery cells to prevent ignition possibility due to internal short circuit when swelling occurs due to overcharge of the secondary battery pack.

TECHNICAL SOLUTION

In one general aspect, a secondary battery pack includes a plurality of secondary battery modules including a plurality of secondary battery cells stacked in parallel to each other in a vertical direction, a cover for covering an uppermost surface of the secondary battery cells and with one side and the other side in a horizontal direction being rotatable around a central portion in a horizontal direction as a rotation axis, and a switch installed at an upper side of the one end in the horizontal direction of the cover, a housing for accommodating the secondary battery modules therein, a Power Relay Assembly (PRA) comprising a relay electrically connected to the secondary battery cells and switches, for transmitting charging power supplied from the outside to the secondary battery cells when the relay is in a close state and changing the relay to an open state when the switch is pushed according to pressure applied to an upper side from a lower surface of the cover, and a Battery Management System (BMS) for controlling the Power Relay Assembly (PRA).

The cover may further include a support member for supporting the central portion in the horizontal direction.

The support member may surround both the central portion in the horizontal direction of the cover and a central portion in a horizontal direction of the secondary battery cells.

The secondary battery module may further include a fixing member for fixing the switch to the upper side of the cover.

The secondary battery module may further include a cutting groove concaved forward and backward at one end in the horizontal direction of the cover, wherein the cutting groove is cut according to pressure applied to the upper side from the lower surface of the cover, and the switch may be installed at an upper side of the cutting groove.

The cutting groove may be formed in the lower surface of the cover.

ADVANTAGEOUS EFFECTS

The secondary battery pack according to an exemplary embodiment of the present invention may shut off power supplied to secondary battery cells to prevent ignition possibility due to an internal short circuit when swelling occurs due to overcharge of the secondary battery pack.

DESCRIPTION OF DRAWINGS

FIG. 1 is a perspective view of a battery pack according to an exemplary embodiment of the present invention.

FIG. 2 is a plan view of a battery pack according to an exemplary embodiment of the present invention.

FIG. 3 is a perspective view of a secondary battery module according to an exemplary embodiment of the present invention.

FIG. 4 is an operational diagram of a secondary battery module according to an exemplary embodiment of the present invention.

FIG. 5 is an electric circuit diagram of a battery pack according to an exemplary embodiment of the present invention.

BEST MODE

Hereinafter, embodiments of the present invention will be described in detail with reference to the accompanying drawings.

However, the drawings are to help a specific understanding of the present invention, and a scope of the present invention is not limited to the following drawings.

FIG. 1 is a perspective view of a battery pack 1000 according to an exemplary embodiment of the present invention. FIG. 2 is a plan view of the battery pack 1000 according to an exemplary embodiment of the present invention. FIG. 3 is a perspective view of a secondary battery module 100 according to an exemplary embodiment of the present invention.

As illustrated in FIGS. 1 to 3, the battery pack 1000 according to an exemplary embodiment of the present invention may include a secondary battery module 100, a housing 200, a Power Relay Assembly (PRA) 300, and a battery management system (BMS) 400.

The secondary battery module 100 may include a plurality of secondary battery cells 110 that are stacked in parallel to each other in a vertical direction, a cover 120, and a runway arrest device (RAD) switch.

The secondary battery cell 110 may be a component for storing power and may include a cathode plate (not shown) including a cathode current collector coated with a cathode active material layer, an anode plate (not shown) including an anode current collector coated with an anode active material layer, and a separation membrane (not shown) interposed between the cathode plate and the anode plate.

The cathode plate, the anode plate, and the separator may be stacked in a stacking manner or wound in a winding manner. The cathode plate, the anode plate, and the separator may be accommodated and sealed in a pouch (not shown) to constitute the secondary battery cell 110.

The secondary battery cells 110 may further include a cathode tab (not shown) and an anode tab (not shown) which protrude from the cathode plate and the anode plate, respectively, for power connection.

The cathode tab and the anode tab may protrude from one side of the secondary battery cell 110 or protrude from one side and the other side of the secondary battery cell 110, respectively.

The cover 120 may be configured in the form of a plate, formed to correspond to an uppermost surface of the secondary battery cells 110 so as to cover the uppermost surface of the secondary battery cells 110, and configured in such a way that one side and the other side in a horizontal direction of the cover 120 are capable of rotating around a central portion in the horizontal direction as a rotation axis. Here, the uppermost surface of the secondary battery cells 110 may refer to an upper surface of an uppermost secondary battery cell 110 among the secondary battery cells 110 that are stacked in parallel to each other in a vertical direction.

One side and the other side in the horizontal direction of the cover 120 may upwardly rotate according to pressure applied to an upper side from a lower surface of the cover 120 when swelling occurs due to overcharge of the secondary battery cell 110.

In addition, the cover 120 may further include a support member 125 that supports a central portion in the horizontal direction and may be configured in such a way that one side and the other side in the horizontal direction of the cover 120 are capable of rotating up and down around the support member 125 as a rotation axis.

The support member 125 may be formed to surround both in a horizontal direction of a central portion of the cover 120 and a horizontal direction of a central portion of the secondary battery cells 110 so as to more tightly support the horizontal direction of the central portion A switch 130 may be installed at an upper side of one side in the horizontal direction of the cover 120 and pushed when one side and the other side in the horizontal direction of the cover 120 are upwardly rotated according to pressure applied to an upper side from a lower surface of the cover 120 when swelling occurs due to overcharge of the secondary battery cell 110 described above.

That is, the switch 130 may detect swelling of the secondary battery cells 110.

The secondary battery module 100 may further include a fixing member 140 for fixing the switch 130 to an upper side of the cover 120.

The fixing member 140 may be formed with an arch shape and configured in such a way that the switch 130 is coupled to a concave portion of the fixing member 140, and two opposite ends of the fixing member 140 are coupled to an upper surface of one end in the horizontal direction of the cover 120 so as to fix the switch 130 to the upper side of the cover 120.

In addition, the secondary battery module 100 may further include an interval preservation plate (not shown) interposed between the secondary battery cells 110 to preserve an interval therebetween.

The interval preservation plate may absorb heat generated from the secondary battery cells 110 and dissipate the heat to the outside.

The housing 200 may have an upper portion that is opened and include secondary battery modules 100 that are arranged and accommodated in parallel to each other in the housing 200.

In addition, the housing 200 may be formed of an insulating material for electric insulation from the outside.

The PRA 300 may include a relay that is electrically connected to the secondary battery cells 110 and the switches 130. In this regard, when the relay is closed, charging power supplied from the outside may be transmitted to the secondary battery cells 110, and the relay may be changed to an open state so as to prevent the charging power from being transmitted to the secondary battery module 100 when at least one of the switches 130 is pushed according to pressure applied to an upper side from the lower surface of the cover 120 of the secondary battery cells 110.

In this case, the charging power may be applied from an external power source such as a prime mover of a vehicle or a generating apparatus of an electric power station, and the PRA 300 may further include a capacitor for uniformly adjusting the amount of the charging power and transmitting the charging power to the secondary battery cells 110.

The BMS 400 may control the PRA 300 and when the relay is not changed to an open state even if the switch 130 is pushed, the BMS 400 may issue a compulsory control command to the relay so as to compulsorily change the relay to the open state.

Referring to FIG. 3, the secondary battery module 100 may include a cutting groove 121 that is concave forward and backward at one end in the horizontal direction of the cover 120, the cutting groove 121 may be cut according to pressure applied to the upper side from the lower surface of the cover 120, and the switch 130 may be installed at an upper side of the cutting groove 121.

Although FIG. 3 illustrates an exemplary embodiment in which the cutting groove 121 is formed in a wave form, the present invention is not limited thereto.

FIG. 4 is an operational diagram according to swelling of the secondary battery module 100 according to an exemplary embodiment of the present invention.

With reference to FIG. 4, an operating principle according to swelling due to overcharge in the secondary battery module 100 according to the exemplary embodiment of the present invention will be described.

First, when the relay is closed, the PRA 300 transmits charging power supplied from the outside to the secondary battery cells 110.

Then, when swelling occurs due to overcharge of the secondary battery module 100, pressure applied to the upper side from the lower surface of the cover 120 is directed toward the central portion of the cover 120.

Then, as the pressure is distributed to one end and the other end in the horizontal direction of the cover 120 by the support member 125 that supports the central portion of the cover 120, the one end and the other end in the horizontal direction of the cover 120 push the switch 130 using the support member 125 as a rotation axis.

Then, the relay is changed to an open state while pushing the switch 130 so as to prevent charging power from being transmitted to the secondary battery cells 110.

Accordingly, the secondary battery pack 1000 according to the exemplary embodiment of the present invention may shut off power supplied to the secondary battery cells 110 so as to prevent ignition possibility due to internal short circuit when swelling occurs due to overcharge of the secondary battery pack 1000.

The secondary battery pack 1000 according to the exemplary embodiment of the present invention may further include a through bolt for passing through and fixing the cover 120 and the secondary battery cells 110 so as to more tightly fix the cover 120 to the secondary battery cells 110. In this case, the through bolt may be formed through an edge of a pouch of the secondary battery cell 110.

FIG. 5 is an electric circuit diagram of the battery pack 1000 according to an exemplary embodiment of the present invention.

As illustrated in FIG. 5, the battery pack 1000 according to the exemplary embodiment of the present invention may be configured in such a way that the secondary battery cells 110 are arranged in parallel to each other, the switches 130 are installed on the secondary battery cells 110, respectively, the secondary battery cells 110 are electrically connected to each other to constitute a first closed circuit, the PRA 300 is electrically connected to the first closed circuit to supply power supplied from the outside to the secondary battery cells 110, the BMS 400 is electrically connected to the PRA 300, and a ground member 310 is installed at one side of the BMS 400.

As described above, the PRA 300 may transmit charging power supplied from the outside to the secondary battery cells 110 when the relay is in a close state and transmit the charging power supplied from the outside to the ground member 310 instead of the secondary battery cells 110 when the switch 130 is pushed and the relay is in an open state.

While the present invention has been particularly shown and described with reference to exemplary embodiments thereof, it will be understood by those of ordinary skill in the art that various changes in form and details may be made therein without departing from the spirit and scope of the present invention as defined by the following claims.

EXPLANATION OF REFERENCE NUMERALS

1000: secondary battery pack
100: secondary battery module
110: secondary battery cell 120: cover
121: cutting groove 125: support member
130: switch 140: fixing member
200: housing
300: PRA
400: BMS

The invention claimed is:

1. A secondary battery pack comprising:
a plurality of secondary battery modules comprising a plurality of secondary battery cells stacked in parallel to each other in a vertical direction, a cover covering an uppermost surface of the secondary battery cells and a support member supporting a central portion in a horizontal direction, and a switch disposed above one side of the cover;
a housing for accommodating the secondary battery modules therein;
a Power Relay Assembly (PRA) comprising a relay electrically connected to the secondary battery cells and switches, for transmitting charging power supplied from the outside to the secondary battery cells when the relay is in a close state and changing the relay to an open state when the switch is pushed; and
a Battery Management System (BMS) for controlling the Power Relay Assembly (PRA),
wherein
the support member surrounds both the central portion in the horizontal direction of the secondary battery cells and the cover,
the central portion of the cover is fixed and the one side of the cover is lifted upward when the secondary battery cells are expanded, and the switch is pushed by the one side of the cover which is lifted.

2. The secondary battery pack of claim 1, wherein the secondary battery module further comprises a fixing member for fixing the switch to the upper side of the cover.

3. The secondary battery pack of claim 1, wherein: the secondary battery module further comprises a cutting groove concave forward and backward at one end in the horizontal direction of the cover, wherein the cutting groove is cut according to pressure applied to the upper side from the lower surface of the cover; and the switch is installed at an upper side of the cutting groove.

4. The secondary battery pack of claim 3, wherein the cutting groove is formed in the lower surface of the cover.

* * * * *